United States Patent
Shimizu

(10) Patent No.: US 8,506,148 B2
(45) Date of Patent: Aug. 13, 2013

(54) LIGHTING DEVICE, DISPLAY DEVICE AND TELEVISION RECEIVER

(75) Inventor: Takaharu Shimizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 294 days.

(21) Appl. No.: 13/125,576

(22) PCT Filed: Jul. 23, 2009

(86) PCT No.: PCT/JP2009/063165
§ 371 (c)(1),
(2), (4) Date: Apr. 22, 2011

(87) PCT Pub. No.: WO2010/058625
PCT Pub. Date: May 27, 2010

(65) Prior Publication Data
US 2011/0194034 A1 Aug. 11, 2011

(30) Foreign Application Priority Data
Nov. 20, 2008 (JP) .................................. 2008-297086

(51) Int. Cl.
*F21V 7/04* (2006.01)
*F21V 8/00* (2006.01)
*G02F 1/13357* (2006.01)

(52) U.S. Cl.
USPC ........... 362/606; 362/612; 362/616; 362/619; 362/625; 362/97.3

(58) Field of Classification Search
USPC ............... 362/97.1–97.4, 297, 307, 308, 346, 362/311.02, 237, 238, 240, 241, 246, 247, 362/249.02, 606, 612, 613, 615–620, 623–626; 349/63, 64
See application file for complete search history.

(56) References Cited

U.S. PATENT DOCUMENTS 8,284,347 B2 * 10/2012 Ajichi et al. .................... 349/65
2002/0097354 A1 7/2002 Greiner
(Continued)

FOREIGN PATENT DOCUMENTS

CN 1503038 A 6/2004
CN 1641436 A 7/2005
(Continued)

OTHER PUBLICATIONS

Official Communication issued in International Patent Application No. PCT/JP2009/063165, mailed on Aug. 18, 2009.

*Primary Examiner* — Thomas Sember
(74) *Attorney, Agent, or Firm* — Keating & Bennett, LLP

(57) ABSTRACT

A backlight unit 12 includes an LED 16 and a light guide plate 18. The LED 16 has light emitting surfaces 16*d*, 16*e*. The light guide plate 18 has light entrance surfaces 18*b*, 18*c* and a light exit surface 18*d*. The light entrance surfaces 18*b*, 18*c* are provided to face the light emitting surfaces 16*d*, 16*e* respectively and rays of light emitted from the light emitting surfaces 16*d*, 16*e* enter the light entrance surfaces 18*b*, 18*c*. The rays of light entering the light entrance surfaces 18*b*, 18*c* exit from the light exit surface 18*d*. The light emitting surfaces 16*d*, 16*e* include a first light emitting surface 16*d* substantially parallel to the light exit surface 18*d* and second light emitting surfaces 16*e*. A plane on the first light emitting surface 16*d* crosses a plane on each second light emitting surface 16*e*. The light entrance surfaces 18*b*, 18*c* include a first light entrance surface 18*b* provided to face the first light emitting surface 16*d* and substantially parallel to the light exit surface 18*d* and second light entrance surfaces 18*c* provided to face the second light emitting surfaces 16*e*. A plane on the first light entrance surface 18*b* crosses a plane on each second light entrance surface 18*c*.

23 Claims, 8 Drawing Sheets

(56) References Cited

U.S. PATENT DOCUMENTS

| | | |
|---|---|---|
| 2004/0141304 A1 | 7/2004 | Nagakubo et al. |
| 2005/0265029 A1 | 12/2005 | Epstein et al. |
| 2006/0262564 A1 | 11/2006 | Baba |
| 2008/0144312 A1 | 6/2008 | Greiner |
| 2010/0110330 A1* | 5/2010 | Ajichi et al. ............. 349/62 |

FOREIGN PATENT DOCUMENTS

| | | |
|---|---|---|
| CN | 1918494 A | 2/2007 |
| JP | 09-306222 A | 11/1997 |
| JP | 3063458 U | 11/1999 |
| JP | 2002-324409 A | 11/2002 |
| JP | 2003-215350 A | 7/2003 |
| JP | 2005-135760 A | 5/2005 |
| JP | 2005-352427 A | 12/2005 |
| JP | 2006-108045 A | 4/2006 |
| JP | 2006-351522 A | 12/2006 |
| JP | 2007-524206 A | 8/2007 |
| JP | 2008-503034 A | 1/2008 |
| WO | WO2008/029540 * | 3/2008 |

* cited by examiner

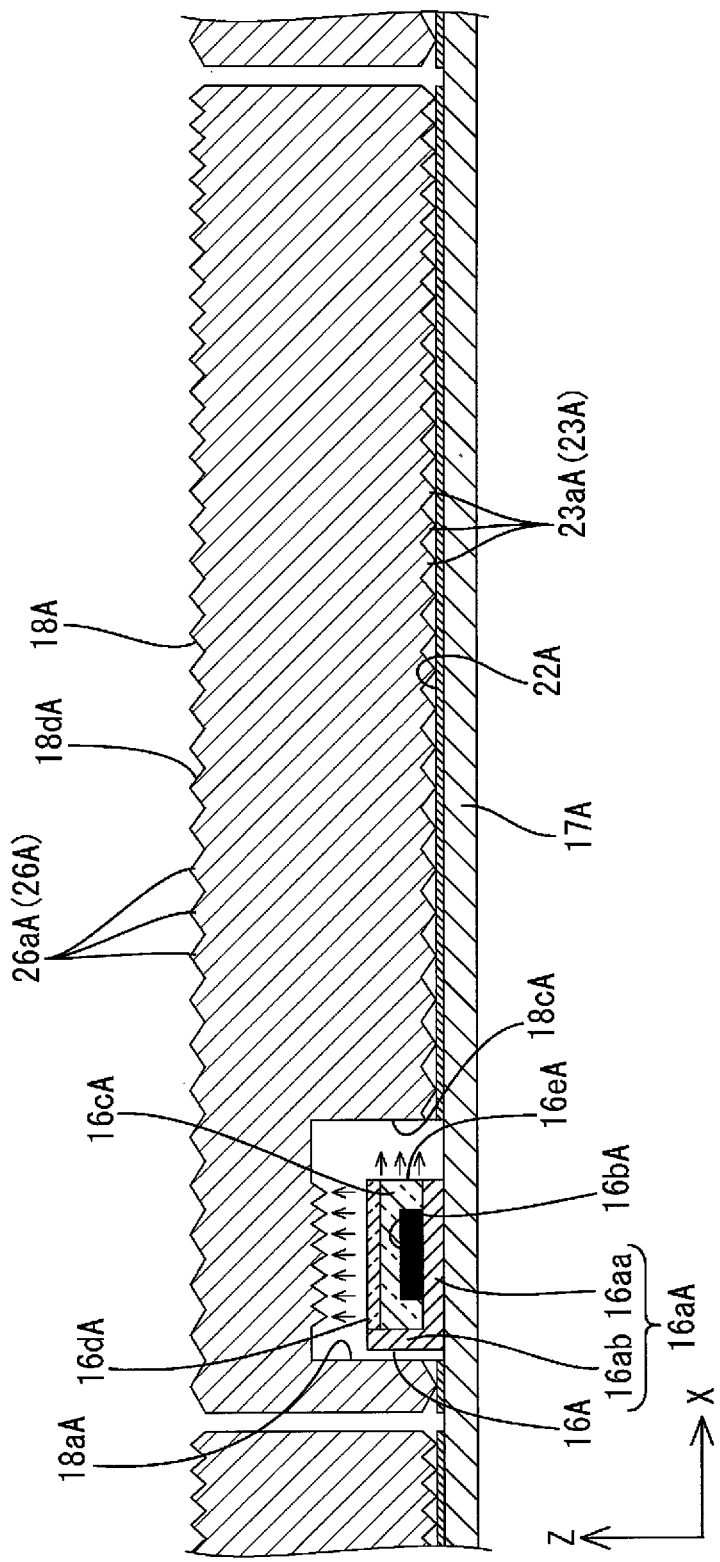

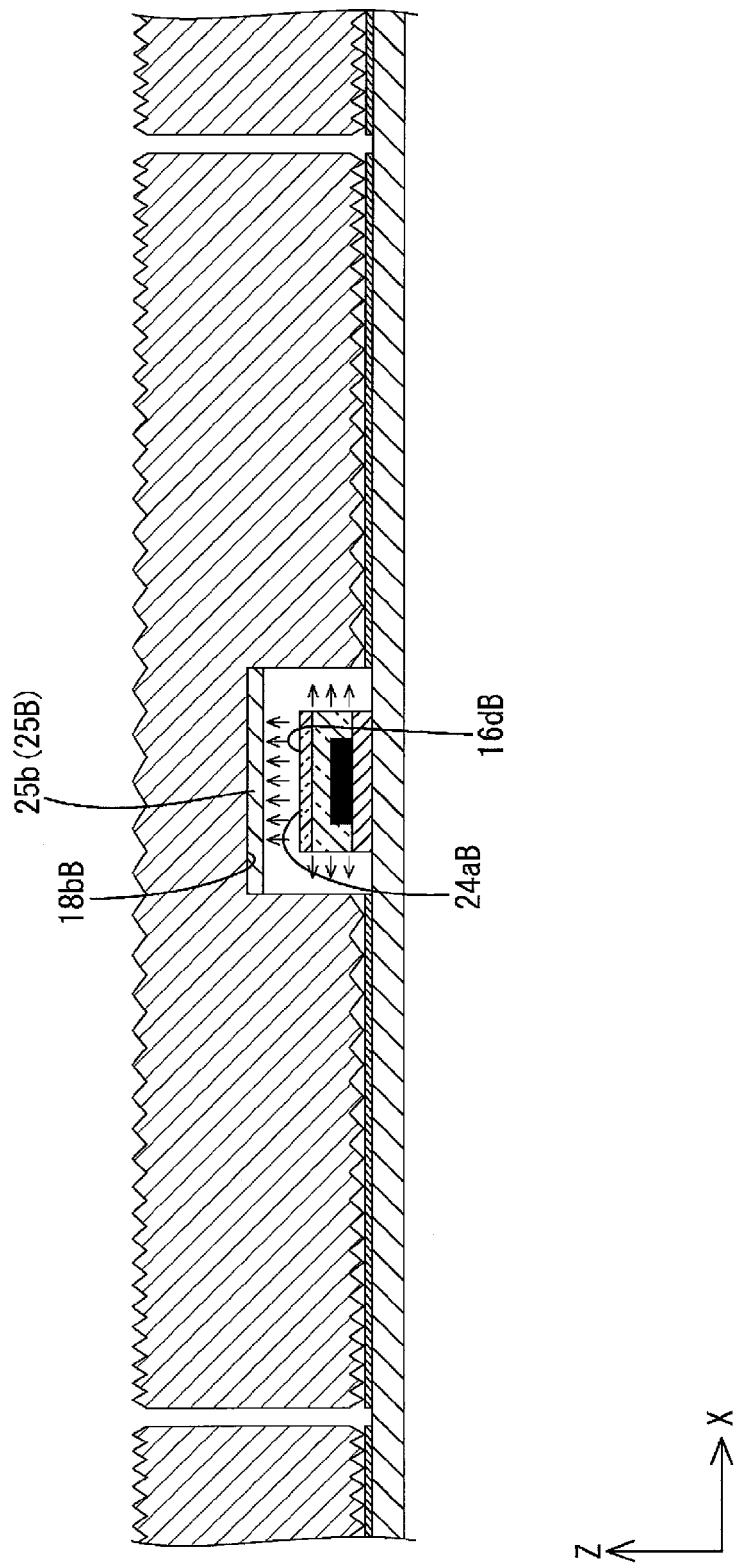

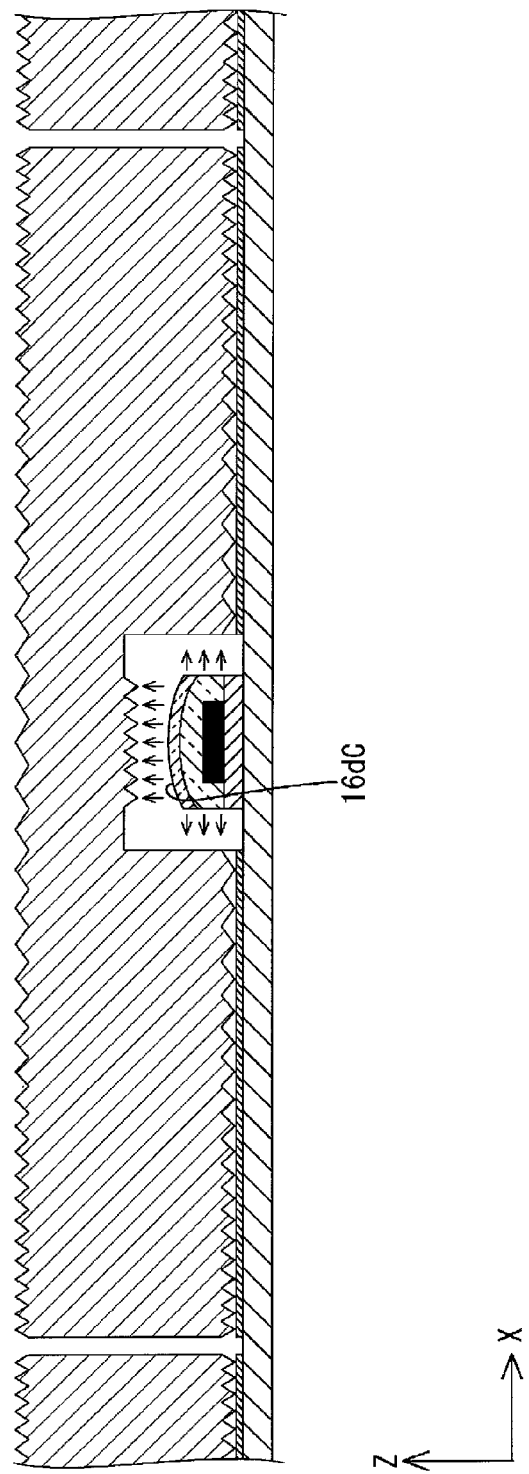

LIGHTING DEVICE, DISPLAY DEVICE AND TELEVISION RECEIVER

TECHNICAL FIELD

The present invention relates to a lighting device, a display device and a television receiver.

BACKGROUND ART

In recent years, displays of image display devices including television receivers are shifting from conventional cathode-ray tube displays to thin-screen displays including liquid crystal panels and plasma display panels. With the thin-screen displays, thin image display devices can be provided. A liquid crystal display device requires a backlight unit as a separate lighting device because a liquid crystal panel used therein is not a light-emitting component. The backlight units are divided into two types including direct-type backlight units and side-light type backlight units depending on the mechanism. Patent Document 1 describes an example of the direct-type backlight units and Patent Document 2 describes an example of the side-light type backlight units.

Patent Document 1: Japanese Published Patent Application No. 2003-215350

Patent Document 1: Japanese Published Patent Application No. 2006-108045

Problem to be Solved by the Invention

In the direct-type backlight unit, the light source is arranged just below the light guide plate and the light entrance surface and the light exit surface of the light guide plate are provided to be parallel to each other. However, the in-plane brightness distribution of the light exit surface of the light guide plate is not uniform. The brightness is partially high in the areas adjacent to the light source and uneven brightness is likely to be caused. To solve this problem, the distance between the light source and the light guide plate is necessarily increased, and this makes the liquid crystal display device to increase its thickness.

In the side-light type backlight unit, the light sources are arranged at the side end areas of the light guide plate and the light entrance surface is perpendicular to the light exit surface. Therefore, the side-light type backlight unit is suitable for reducing the thickness of the liquid crystal display device rather than the direct-type one. However, the rays of right entering the light guide plate do not exit directly from the light exit surface but are directed to the light exit surface by the reflection sheet provided on a surface of the light guide plate opposite from the light exit surface. This lowers the light using efficiency and the brightness of a whole device is likely to be deteriorated.

DISCLOSURE OF THE PRESENT INVENTION

The present invention was made in view of the foregoing circumstances. An object of the present invention is to keep uneven brightness from occurring and obtain improved brightness and reduce a thickness of a device.

Means for Solving the Problem

A lighting device of the present invention includes a light source and a light guide member. The light source has a light emitting surface. The light guide member has a light entrance surface that light emitted from the light emitting surface enters and a light exit surface from which the light exits. The light emitting surface includes a first light emitting surface and a second light emitting surface. The first light emitting surface is substantially parallel to the light exit surface and a plane on the first light emitting surface crosses a plane on the second light emitting surface. The light entrance surface includes a first light entrance surface and a second light entrance surface. The first light entrance surface is provided to face the first light emitting surface and substantially parallel to the light exit surface and the second light entrance surface is provided to face the second light emitting surface. A plane on the first light entrance surface crosses a plane on the second light entrance surface.

The first light emitting surface and the first light entrance surface are provided to be substantially parallel to the light exit surface, and therefore, the light emitted from the first light emitting surface and entering the first light entrance surface exits directly from the light exit surface. Therefore, the light exits from the light exit surface at improved use efficiency and brightness is improved. A plane on each of the second light emitting surface and the second light entrance surface crosses a plane on each of the first light emitting surface and the first light entrance surface that are substantially parallel to the light exit surface. Therefore, compared to the light emitted from the first light emitting surface and entering the first light entrance surface, the light emitted from the second light emitting surface and entering the second light entrance surface is likely to be radiated in a wide range in the light guide member in the direction along the light exit surface. Accordingly, uneven in-plane brightness distribution in the light exit surface is less likely to be caused and the thickness can be reduced.

BRIEF DESCRIPTION OF THE DRAWINGS

[FIG. 6] is a cross-sectional view of an LED and a light guide plate according to a second embodiment along the long side thereof;

[FIG. 7] is a cross-sectional view of an LED and a light guide plate according to a third embodiment along the long side thereof; and

[FIG. 8] is a cross-sectional view of an LED and a light guide plate according to a fourth embodiment along the long side thereof.

BEST MODE FOR CARRYING OUT THE INVENTION

<First Embodiment>

Figure 2:
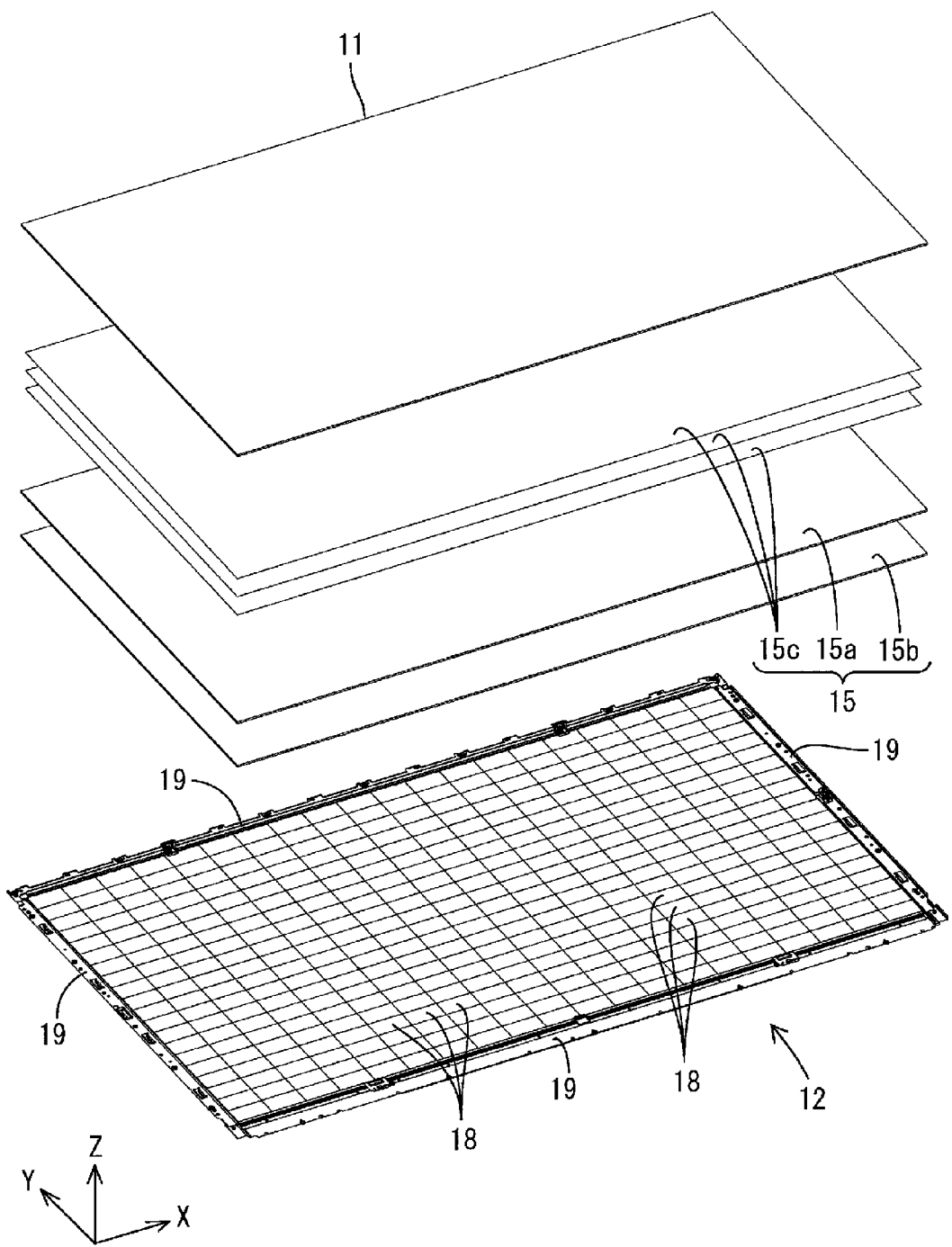
[FIG. 2] is an exploded perspective view illustrating a general construction of a liquid crystal panel and a backlight unit.
Figure 3:
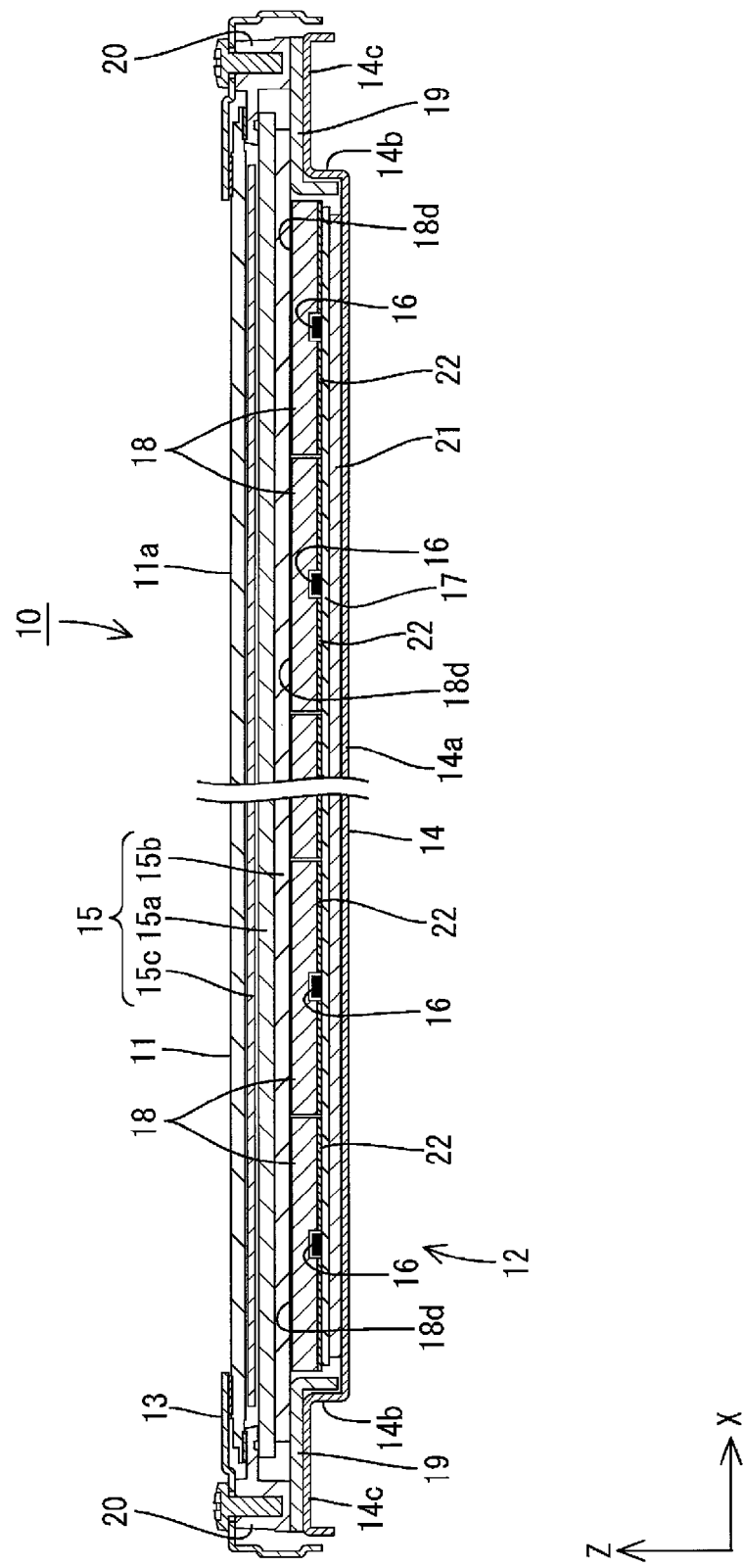
[FIG. 3] is a cross-sectional view of a liquid crystal display device along the long side thereof.

The first embodiment of the present invention will be explained with reference to FIGS. 1 to 5. In this embodiment, a liquid crystal display device 10 will be explained. X-axes, Y-axes and Z-axes in some figures correspond to each other so as to indicate the respective directions. In FIGS. 2 and 3, the upper side and the lower side correspond to the front-surface side and the rear-surface side, respectively.

Figure 1:
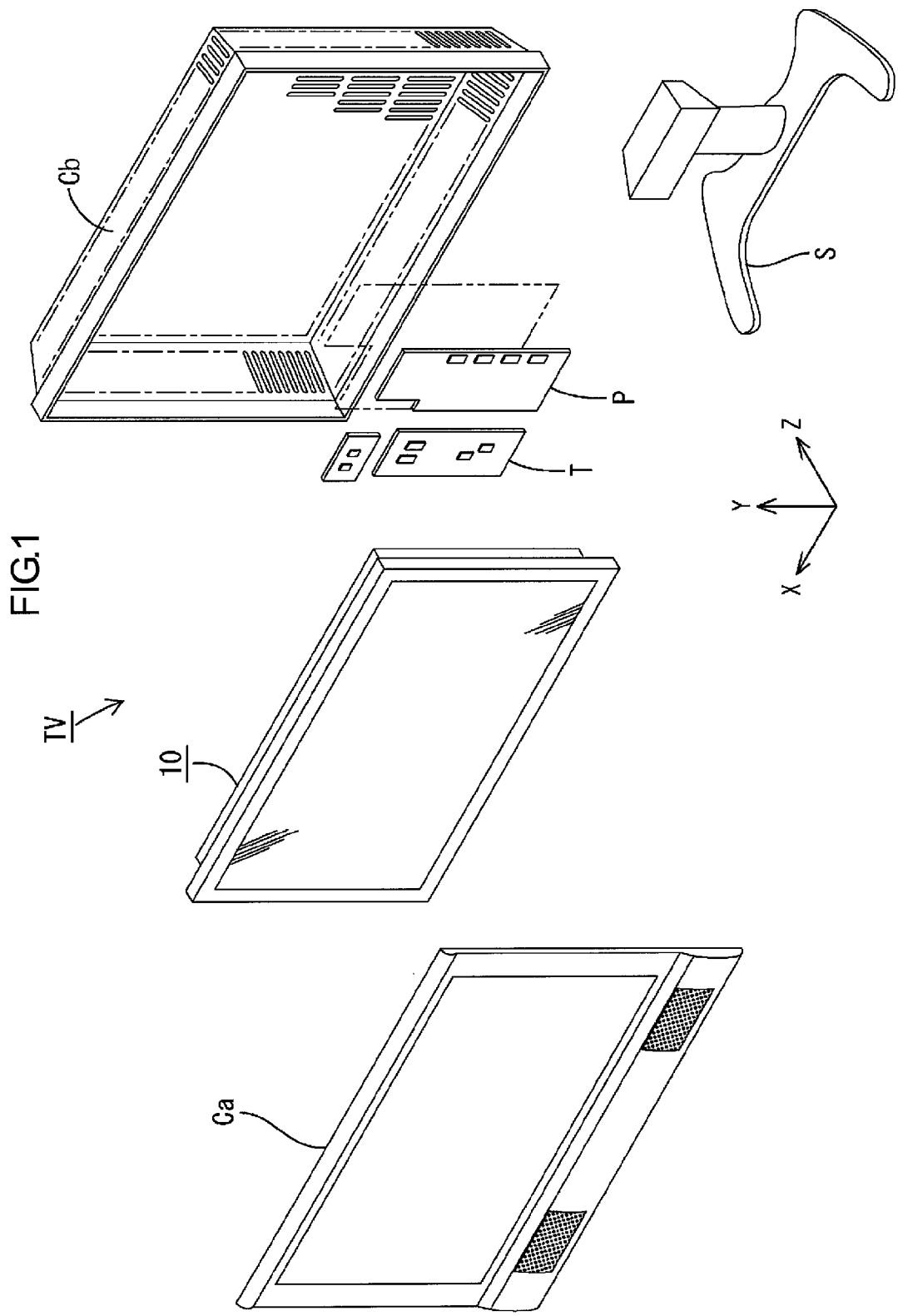
[FIG. 1] is an exploded perspective view illustrating a general construction of a television receiver according to the first embodiment of the present invention.

As illustrated in FIG. 1, the television receiver TV includes the liquid crystal display device 10 (a display device), cabinets Ca and Cb, a power source P, and a tuner T. The cabinets Ca and Cb sandwich the liquid crystal display device 10 therebetween. The liquid crystal display device 10 is housed in the cabinets Ca and Cb. The liquid crystal display device 10 is held by a stand S in a vertical position in which a display surface 11a is set along a substantially vertical direction (the Y-axis direction). The liquid crystal display device 10 has a landscape rectangular overall shape. As illustrated in FIG. 2, the liquid crystal display device 10 includes a liquid crystal panel 11, which is a display panel, and a backlight unit 12 (an example of a lighting device), which is an external light source. The liquid crystal panel 11 and the backlight unit 12 are held together by a frame-shaped bezel 13 as illustrated in FIG. 2.

"The display surface 11a is set along the vertical direction" is not limited to a condition that the display surface 11a is set parallel to the vertical direction. The display surface 11a may be set along a direction closer to the vertical direction than the horizontal direction. For example, the display surface 11a may be 0° to 45° slanted to the vertical direction, preferably 0° to 30° slanted.

Next, the liquid crystal panel 11 and the backlight unit 12 included in the liquid crystal display device 10 will be explained. The liquid crystal panel (a display panel) 11 has a rectangular plan view and includes a pair of transparent glass substrates bonded together with a predetermined gap therebetween and liquid crystals sealed between the substrates. On one of the glass substrates, switching components (e.g., TFTs), pixel electrodes and an alignment film are arranged. The switching components are connected to gate lines and the source lines that are perpendicular to each other. The pixel electrodes are connected to the switching components. On the other glass substrate, color filters including R (red) G (green) B (blue) color sections in predetermined arrangement, a counter electrode and an alignment film are arranged. Polarizing plates are arranged on outer surfaces of the glass substrates, respectively.

Next, the backlight unit 12 will be explained in detail. As illustrated in FIG. 3, the backlight unit 12 includes a chassis 14, an optical member 15, LEDs 16 (light emitting diodes), LED boards 17 and light guide plates 18. The chassis 14 has a box-like overall shape and an opening on the front side (the liquid crystal panel 11 side, the light output side). The optical member 15 is arranged so as to cover the opening. The LEDs 16 are light sources arranged inside the chassis 14. The LEDs 16 are mounted on the LED boards 17. Rays of light emitted from the LEDs 16 are directed to the optical member 15 by the light guide plates 18. The backlight unit 12 further includes a support member 19, a holddown member 20 and heat sinks 21. The support member 19 holds diffusers 15a and 15b included in the optical member 15 from the rear side. The holddown member 20 holds down the diffusers 15a and 15b from the front side. The heat sinks 21 are provided for dissipation of heat generated while the LEDs 16 emit light.

Next, components of the backlight unit 12 will be explained in detail. The chassis 14 is made of metal and has a shallow-box-like overall shape (or a shallow-bowl-like overall shape) with the opening on the front-surface side. The chassis 14 includes a bottom plate 14a, side plates 14b and support plates 14c. The bottom plate 14a has a rectangular shape similar to the liquid crystal panel 11. The side plates 14b rise from the respective edges of the bottom plate 14a. The support plates 14c project outward from the respective end edges of the side plates 14b. The long-side direction and the short-side direction of the chassis 14 correspond to the horizontal direction (the X-axis direction) and the vertical direction (the Y-axis direction), respectively. The support plates 14c of the chassis 14 are configured such that the support member 19 and the holddown member 20 are placed thereon, respectively, from the front-surface side. Each support plate 14c is configured to hold the bezel 13, the support member 19 and the holddown member 20 together with screws. A mounting structure (not shown) for mounting the LED board 17 and the light guide plate 18 is provided on the bottom plate 14a. The mounting structure includes screw holes or insertion holes that are through holes for receiving the screws to be tightened up or inserting screws therein when mounting the LED board 17 and the light guide plate 18 with screws.

The optical member 15 is arranged between the liquid crystal panel 11 and the light guide plates 18. It includes the diffusers 15a and 15b arranged on the light guide plate 18 side, and an optical sheet 15c arranged on the liquid crystal panel 11 side. Each of the diffusers 15a and 15b includes a transparent resin base material with a predefined thickness and a large number of diffusing particles scattered in the base material. The diffusers 15a and 15b have functions of diffusing light that passes therethrough. The diffusers 15a and 15b having the same thickness are placed on top of each other. The optical sheet 15c is a thin sheet having a smaller thickness than that of the diffusers 15a and 15b. The optical sheet 15c includes three sheets placed on top of each other, more specifically, a diffusing sheet, a lens sheet and a reflection-type polarizing sheet arranged in this order from the diffuser 15a, 15b side (i.e., from the rear-surface side).

The support member 19 and the holddown member 20 are formed in a frame-like shape so as to follow outer peripheral portions of the liquid crystal panel 11 and the optical member 15. The support member 19 is placed directly on the support plate 14c of the chassis and receives the outer peripheral portions of the diffuser 15b on the rear-surface side of the optical member 15 from the rear-surface side. The holddown member 20 is placed on the support member 19 and hold down the diffuser 15a on the front-surface side of the optical member 15 from the front-surface side. The diffusers 15a, 15b are sandwiched between the support member 19 and the holddown member 20. The holddown member 20 receives the outer peripheral portions of the liquid crystal panel 11 from the rear-surface side and the liquid crystal panel 11 is sandwiched between the holddown member 20 and the bezel 13 that holds down the outer peripheral portions of the liquid crystal panel 11 from the front-surface side. The bezel 13 is formed in a frame-like shape so as to surround a display area of the liquid crystal panel 11 like the support member 19 and the holddown member 20.

The heat sink 21 is made of synthetic resin or metal having high thermal conductivity and formed in a sheet-like shape. The heat sink 21 extends along the inner surface of the chassis 14. The heat sink 21 is placed between the bottom plate 14a of the chassis 14 and the LED board 18.

The LED board 17 is made of synthetic resin and the surface thereof are in white that provides high light reflectivity. The LED board 17 extends along the bottom plate 14a of the chassis 14 and is placed on the heat sink 21. Wiring patterns that are metal films are formed on the LED board 17 and the LEDs 16 are mounted in predetermined locations on the LED board 17. The LED board 17 is connected to an external control board, which is not illustrated in the figures. The control board is configured to feed currents for turning on the LEDs 16 and to perform driving control of the LEDs 16.

Mounting structures (not shown) for mounting the LED board 17 to the chassis 14 is provided on the LED board 17. If the LED board 17 is mounted to the chassis 14 by screws, screw holes into which the screws are tightened up or screw insertion holes through which the screws are inserted are provided on the LED board 17 as the mounting structures. Such mounting structures are provided on the light guide plates 18 that will be described later and the same explanation thereof will be omitted.

The LEDs 16 and the light guide plates 18 of the present embodiment will be explained. As illustrated in FIGS. 2 and 3, one light guide plate 18 and the corresponding LED 16 form a unit light emission member. A number of the unit light emission members are arranged along the display surface 11a (X-Y plane) two-dimensionally (in a plane arrangement).

The LEDs 16 are surface-mounted to the LED boards 17, that is, the LEDs 16 are surface-mount LEDs. A number of LEDs 16 are arranged in a planar grid pattern on each LED board 17 in the X-axis direction and in the Y-axis direction (in the horizontal direction and in the vertical direction). The light guide plates 18 are provided between the LED board 17 and the diffuser 15b that is on the rear-surface side of the optical member 15. A number of the light guide plates 18 are arranged to correspond to the LEDs 16 respectively in the X-axis direction and in the Y-axis direction, that is, in a grid pattern (horizontally and vertically, with being tiled). The arrangement pitch (the arrangement interval) of the LEDs 16 on the LED board 17 corresponds to the arrangement pitch of the light guide plates 18. The light guide plates 18 are arranged so as not to overlap the adjacent light guide plates 18 in the X-axis direction and in the Y-axis direction in a plan view. The light guide plates 18 are arranged to have a predetermined gap (space, clearance) therebetween and an air layer AR is provided in the gap. Next, each structure of the LED 16 and the light guide plate 18 will be explained.

Figure 4:
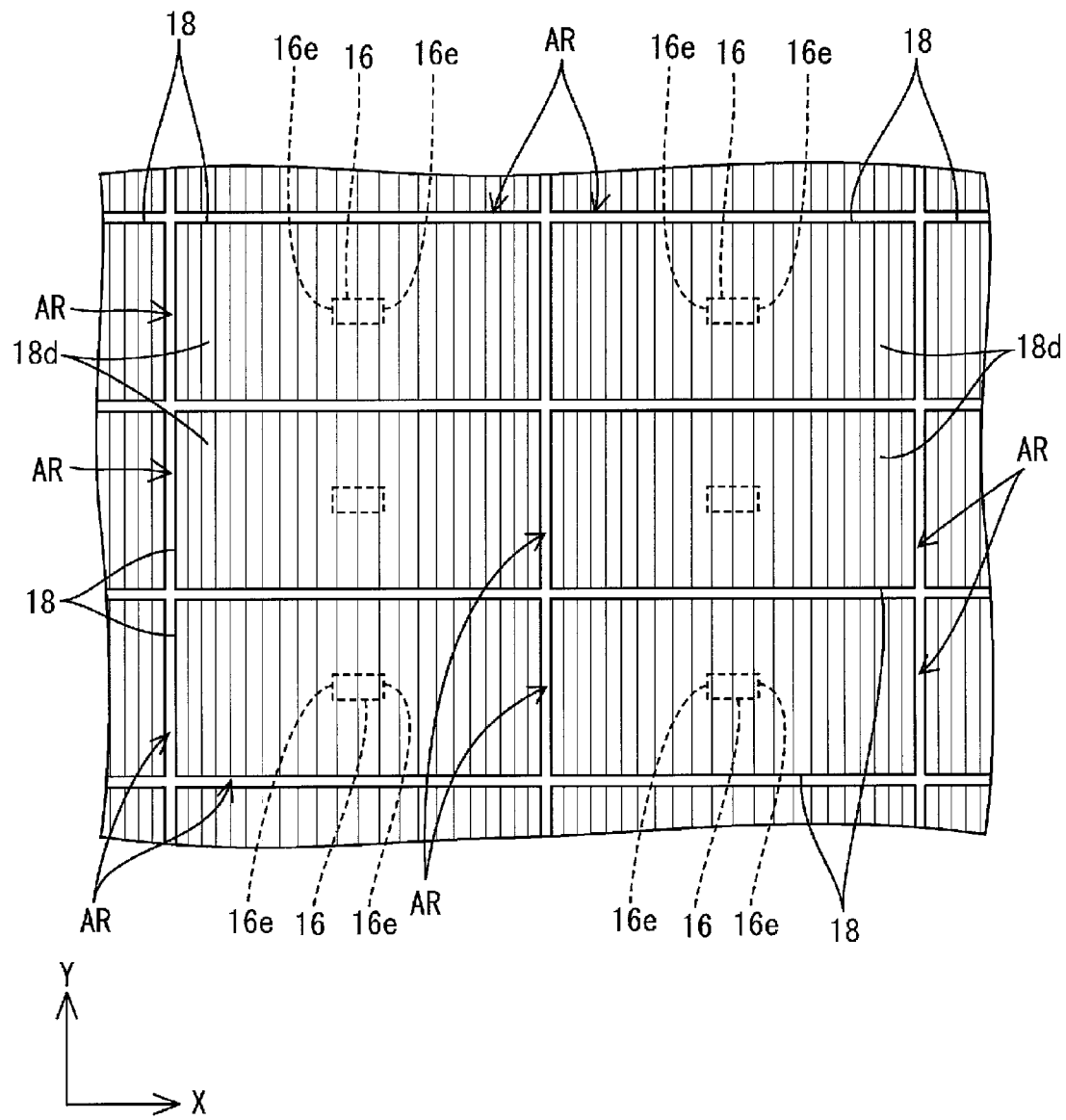
[FIG. 4] is a plan view illustrating an arrangement of LEDs and light guide plates.
Figure 5:
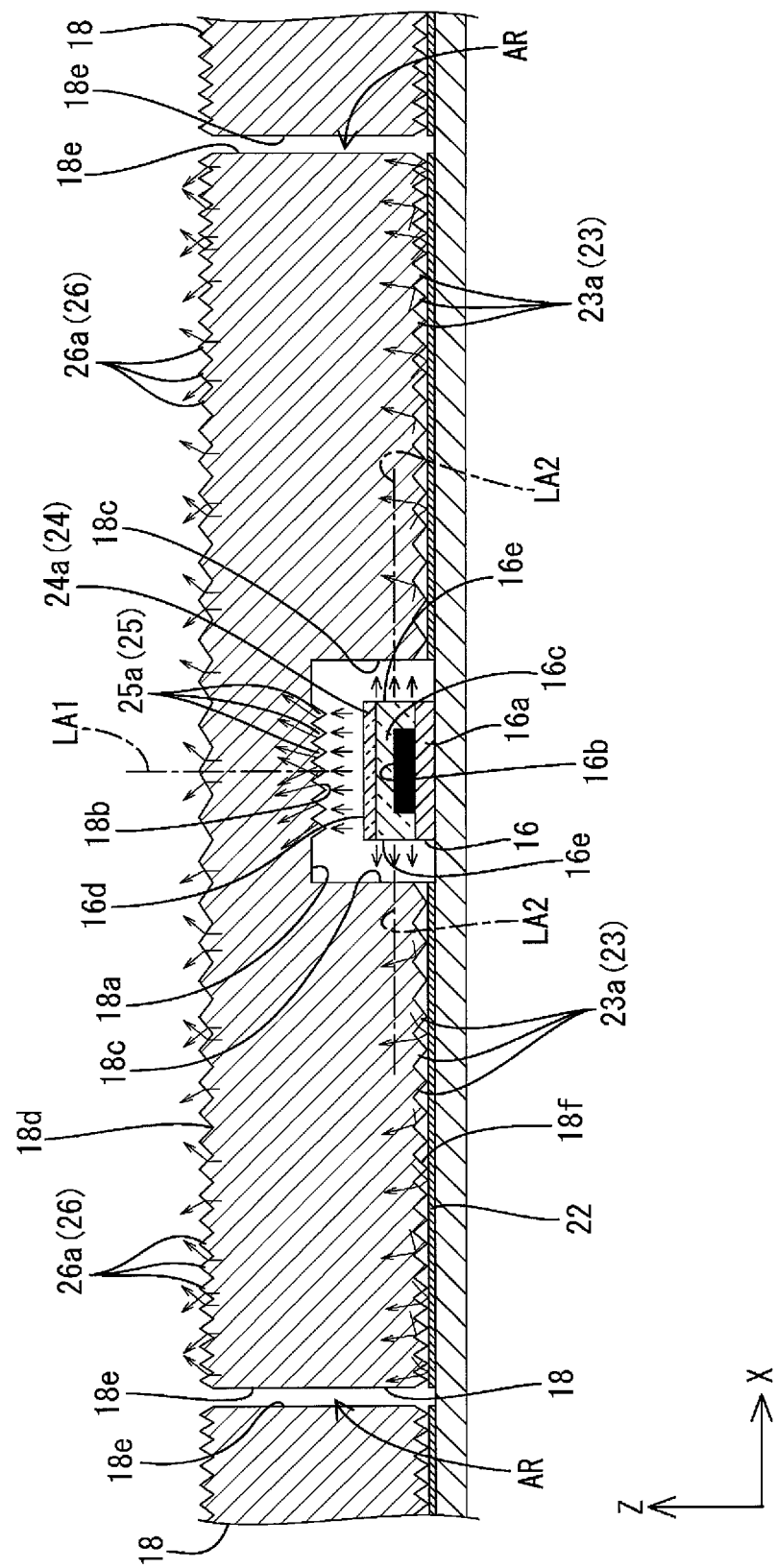
[FIG. 5] is a cross-sectional view of the LED and the light guide plate along the long side thereof.

As illustrated in FIGS. 4 and 5, each LED 16 has a block-like overall shape that is a rectangular shape in a plane view. The LED 16 is arranged such that the long-side direction matches the X-axis direction and the short side direction matches to the Y-axis direction. As illustrated in FIG. 5, the LED 16 includes a board 16a that is to be fixed to the LED board 17, an LED chip 16b mounted on the board 16a, and a resin member 16c for sealing the LED chip 16b. The rear surface of the board 16a is soldered to a land on the LED board 17. The LED 16 mounted on the board 16a includes three different kinds of the LED chips 16c with different main emission wavelengths. Specifically, each LED chip 16c emits a single color of light of red (R), green (G) or blue (B). The resin member 16c fixes the LED chip 16b to the board 16a, and is substantially transparent and is not an optical obstacle against the rays of light emitted from the LED chip 16b.

The LED 16 has two kinds of light emitting surfaces 16d and 16e each emitting light in a different direction. The light emitting surfaces include a first light emitting surface 16d and second light emitting surfaces 16e. The first light emitting surface 16d is formed on the front-surface side of the LED 16 that is a surface facing the light guide plate 18 in the Z-axis direction. The first light emitting surface 16d is substantially parallel to an X-Y plane and extends along a light exit surface 18d of the light guide plate 18 that will be explained later. The second light emitting surfaces 16e are formed on either short-side surfaces of the LED 16 that are a pair of surfaces facing the light guide plate 18 in the X-axis direction. Each of the second light emitting surfaces 16e is substantially parallel to a Y-Z direction and substantially perpendicular to (crosses) the first light emitting surface 16e and the light exit surface 18d that will be explained later. The direction in which rays of light emits from each of the second light emitting surfaces 16e is opposite from each other in the X-axis direction. The LED 16 of the present embodiment is an LED of a three-sided light emission type that emits rays of light from three different surfaces.

The LED 16 emits rays of light having two different light axes LA1, LA2 that are perpendicular to each other. The rays of light having the light axis LA1 exits from the first light emitting surface 16d and the rays of light having the light axis LA2 exits from the second light emitting surfaces 16e. Each of the light axes LA1, LA2 substantially matches a normal line with respect to each light emitting surface 16d, 16e, respectively. Therefore, the first light axis LA1 with respect to the first light emitting surface 16d substantially matches the Z-axis direction and the second light axis LA2 with respect to the second light emitting surface 16e substantially matches the X-axis direction and is perpendicular to the light axis LA1. The second light axes LA2 with respect to the second light emitting surfaces 16e form a straight line. The light exiting from each of the light emitting surfaces 16d, 16e radiates three-dimensionally around the corresponding light axis LA1, LA2 in a specified angle range. The directivity thereof is higher than cold cathode tubes. Namely, angle distributions of the LED 16 shows a tendency that the emission intensity of the LED 16 is significantly high along each light axis LA1, LA2 and sharply decreases as the angle with respect to the light axis LA1, LA2 increases. Therefore, the rays of light emitted from the first light emitting surface 16d are mostly directed to the front-surface side in substantially the Z-axis direction. The rays of light emitted from the second light emitting surfaces 16e are mostly directed in substantially the X-axis direction (the horizontal direction in the liquid crystal display device 10) and the direction in which the rays of light emitted from one of the second emitting surfaces 16e are directed is opposite from the direction in which the rays of light emitted from the another one of the second emitting surfaces 16e are directed.

The light guide plate 18 is made of substantially transparent (i.e., having high light transmission capability) synthetic resin (e.g. polycarbonate), a refractive index of which is significantly higher than that of air. As illustrated in FIGS. 4 and 5, the light guide plate 18 has a plate-like shape having a rectangular overall plan view. The long-side direction of the light guide plate 18 matches the X-axis direction and the short-side direction thereof matches the Y-axis direction. As illustrated in FIG. 5, the light guide plate 18 is provided between the LED board 17 and the diffuser 15b and mounted to the LED board 17 to cover the LED 16 mounted on the LED board 17 from the front-surface side. In other words, the LED 16 is arranged just under the light guide plate 18. An LED housing recess 18a for housing the LED 16 therein is formed on a rear surface of the light guide plate 18 that faces the LED board 17. The LED housing recess 18a is provided in substantially a middle portion of the light guide plate 18 in the X-axis direction and in the Y-axis direction and has a size slightly larger than an overall size of the LED 16. Therefore, when the LED 16 is in the LED housing recess 18a, the LED 16 is placed in a substantially middle portion of the light guide plate 18 and a predetermined gap is provided between an inner surface of the LED housing recess 18a and an outer surface of the LED 16. The surfaces are facing each other.

The surfaces of the LED housing recess 18a facing the light emitting surfaces 16d, 16e of the LED 16 are light entrance surfaces 18b, 18c. The rays of light exiting from the light emitting surfaces 16d, 16e enter the light entrance surfaces 18b, 18c. The surface of the light guide plate 18 on the front-surface side that is a surface facing the diffuser 15b is a light exit surface 18d through which the rays of light traveling through the light guide plate 18 exit. The light exit surface 18d is an X-Y plane surface and is macroscopically a substantial flat surface. Among the light guide plates 18 that are in the plane arrangement, the side surfaces 18e (interfaces with the air layer AR) of the adjacent light guide plates 18 facing each other having a gap therebetween is macroscopically and microscopically a substantial flat surface in the Z-axis direction. Therefore, if the rays of light traveling through the light guide plate 18 strike the end surface 18e that is an interface with the external air layer AR, diffuse reflection of light is less likely to occur. Therefore, incident angles of light that strikes the side surface 18e are larger than a critical angle and thus the light is totally reflected by the side surface 18e and the light is less likely to leak from the side surface 18e into the air layer AR. "Macroscopically" is referred to a condition in that a specific shape is easily recognized by viewing an outer appearance, and "microscopically" is referred to a condition in that a specific shape is less likely to be recognized by viewing an outer appearance and a specific shape is recognized by using a magnifying glass or a microscope.

The light entrance surfaces 18b, 18c include two kinds of them corresponding to each of the light emitting surfaces 16d, 16e. The one is a first light entrance surface 18b facing the first light emitting surface 16d and the another is second light entrance surfaces 18c each facing the second light emitting surface 16e. The first light entrance surface 18b is formed on a surface of the LED housing recess 18a facing the rear-surface side and opposing the LED 16 in the Z-axis direction. The first light entrance surface 18b is substantially parallel to an X-Y plane and also substantially parallel to the first light emitting surface 16d and the light exit surface 18d. The arrangement direction in which the first light entrance surface 18b and the first light emitting surface 16d are arranged is parallel to the light axis LA1 (the Z-axis direction) with respect to the first light emitting surface 16d and perpendicular to the light exit surface 18d. The second light entrance surface 18c is formed on each of the side surfaces of the LED housing recess 18a on the short side, that are a pair of surfaces facing the LED 16 in the X-axis direction. The second light entrance surface 18c is substantially parallel to a Y-Z plane and substantially parallel to the second light emitting surface 16e and substantially perpendicular to the first light emitting surface 16d and the light exit surface 18d. The arrangement direction in which the second light entrance surface 18c and the second light emitting surface 16e are arranged is parallel to the light axis LA2 (the X-axis direction) with respect to the second light emitting surface 16e and parallel to the light exit surface 18d.

The rays of light exiting from each light emitting surface 16d, 16e of the LED 16 and traveling through the light guide plate 18 and entering the first light entrance surface 18b are mostly directed to the front-surface side in the Z-axis direction. Incident angles of light that strikes the light exit surface 18d are less likely to be larger than a critical angle and the rays of light entering the first light entrance surface 18b are guided directly to the front-surface side and exit therefrom. The rays of light entering the second light entrance surface 18c are mostly directed to the side surface 18e of the light guide plate 18 in the X-axis direction and are less likely to exit directly from the light exit surface 18d. On a surface of the light guide plate 18 on the rear-surface side, that is an area of the surface opposite from the light exit surface 18d excepting for the LED housing recess 18a (hereinafter, referred to as a mounting surface 18f on which the reflection sheet 22 is mounted), a reflection surface scattering structure 23 is provided and the reflection sheet 22 for reflecting light toward the light exit surface 18d is provided. The reflection surface scattering structure 23 scatters the light traveling through the light guide plate 18 and the reflection sheet 22 directs the light toward the light exit surface 18d. Accordingly, the rays of light entering the second light entrance surfaces 18c strike the light exit surface 18d at the incident angles smaller than the critical angle and exit indirectly through the light exit surface 18d. A specific configuration of the reflection surface scattering structure 23 such as a shape will be explained later.

The rays of light emitting through the first light emitting surface 16d and strike the first light entrance surface 18b mainly exit through the area of the light exit surface 18d that overlaps the LED 16 in a plan view (LED overlapping area). The rays of light emitting through the second light emitting surfaces 16e and strike the second light entrance surfaces 18c mainly exit through the areas of the light exit surface 18d that do not overlap the LED 16 in a plan view (LED empty areas) (refer to FIG. 4).

As mentioned before, the rays of light emitting through each of the light emitting surfaces 16d, 16e of the LED 16 travel through the light guide plate 18 and thereafter exit through the light exit surface 18d toward the optical member 15 and the liquid crystal panel 11. The rays of light emitting through the first light emitting surface 16d and strike the first light entrance surface 18b are less likely to strike the reflection sheet 22 or the side end surfaces 18e of the light guide plate 18 and exit directly through the light exit surface 18d. This improves use efficiency of light and brightness of the entire device. However, the amount of rays of light exiting from the light exit surface 18d directly from the first light emitting surface 16d is likely to be greater compared to the amount of rays of light exiting from the rest of the area of the light exit surface 18d. This may cause uneven brightness. In the present embodiment, to maintain the improved brightness and achieve the uniform in-plane brightness distribution, scattering structures 24 to 26 are provided on the first light emitting surface 16d, the light entrance surface 18b and the light exit surface 18d, respectively. Hereinafter, each of the scattering structures 24 to 26 will be explained in detail. The first light entrance surface 18b and the light exit surface 18d on which the scattering structures 25, 26 are provided respectively are macroscopically flat surfaces. However, to illustrate a specific shape of each scattering structure 25, 26, the microscopic shape is described in FIG. 5. This is similar to the reflection surface scattering structure 23 provided on the reflection sheet 22 mounting surface 18f.

The light emitting surface scattering structure 24 is provided on the first light emitting surface 16d of the LED 16. The light emitting surface scattering structure 24 includes a diffusing layer 24a having a predetermined amount of diffusing particles (diffusing material) scattered therein. The diffusing layer 24a includes a base member made of a substantially transparent resin material and diffusing particles for scattering (diffusing) the rays of light. The entire transmission of the diffuser layer 24a is lower than that of the light guide plate 18 or the resin material 16c forming the LED 16. The rays of light emitted from the LED chip 16b to be directed to the first light emitting surface 16d are scattered by the diffusing particles in the diffuser layer 24a, and thereafter emitted through the first light emitting surface 16d. Therefore, the directivity thereof is lowered. Namely, angle distributions show a tendency that the emission intensity of the rays of light emitted from the first emitting surface 16d is significantly high along the first light axis LA1 (the Z-axis direction) and does not decrease sharply as the angle to the first light axis LA1 increases.

The light entrance surface scattering structure 25 is provided on the first light entrance surface 18b. The light entrance surface scattering structure 25 is molded by a molding die (not shown) that is used for molding the light guide plate 18 with a resin material. By the molding, a number of microscopic light entrance surface projections 25a are formed on the first light entrance surface 18b. Each light entrance surface projection 25a has an angle structure (has a substantially triangular cross section) and extends in the Y-axis direction. A number of elongated projections 25a are provided to be parallel to each other in the X-axis direction. The light entrance surface projections 25a are provided in substantially equal intervals to be parallel to each other in a regular manner. "In a regular manner" is referred to a condition having a periodic structure. The rays of light emitted from the first light emitting surface 16d strike sloped surfaces of the light entrance surface projections 25a to be scattered when entering the first light entrance surface 18b. This radiates the rays of light in a large plane area of the light exit surface 18d in the light guide plate 18. As a specific molding method of the light entrance surface projections 25a, a number of microscopic recesses are formed on a molding surface of the molding die for forming the first light entrance surface 18b so that a number of microscopic light entrance surface projections 25a corresponding to the recesses are molded.

The light exit surface scattering structure 26 is provided on the light exit surface 18d. Similar to the above-mentioned light entrance surface scattering structure 25, the light entrance surface scattering structure 26 is molded by a molding die for molding the light guide plate 18 with a resin material. By the molding, a number of microscopic light exit surface projections 26a are formed on the light exit surface 18d. Each light exit surface projection 26a has an angle structure (has a substantially triangular cross section) and extends in the Y-axis direction. A number of elongated projections 26a are provided to be parallel to each other in the X-axis direction. The light exit surface projections 26a are provided in an irregular manner. The arrangement pitch of the light exit surface projections 26a is largest in a middle portion of the light guide plate 18 in the x-axis direction, that is a portion overlapping the LED 16 in a plan view and gradually decreases toward the either side end of the light guide plate 18 in the X-axis direction. The farther from the LED 16, the smaller the arrangement pitch becomes, that is, the light exit surface projections 26a are formed in a gradational arrangement. In other words, the closer to the LED 16, the lower the distribution density of the light exit surface projections 26a on the light exit surface 18d plane becomes, and the farther from the LED 16, the higher the distribution density becomes, that is, the light exit surface projections 26a are formed in a regular manner. The rays of light emitting from the light emitting surface 18d strike the sloped surfaces of the light exit surface projections 26a to be scattered. The degree of light scattering is relatively low on the side of the light exit surface 18d closer to the LED 16 in the X-axis direction and that is relatively high on the side farther from the LED 16. The degree of light scattering increases in a gradual and continuous manner as it is farther from the LED 16 and it is lowered in a gradual and continuous manner as it is closer to the LED 16. Accordingly, the rays of light are relatively less likely to exit from the area of the light emitting surface 18d through which the rays of light emitted from the first light emitting surface 16d and entering the first light entrance surface 18b exit (the area closer to the LED 16 and the amount of rays of light emitting therefrom is relatively great). The rays of light are relatively likely to exit from the areas of the light emitting surface 18d through which the rays of light emitted from the second light emitting surfaces 16e and entering the second light entrance surfaces 18c exit (the area farther from the LED 16 and the amount of rays of light emitting therefrom is relatively small). Accordingly, the uniform (equalized) in-plane brightness distribution is achieved on the light exit surface 18d.

Furthermore, in the present embodiment, the reflection surface scattering structure 23 that is provided on the reflection sheet 22 mounting surface 18f of the light guide plate 18 is also formed in a gradational arrangement similar to the light exit surface scattering structure 26. Namely, similar to the above-mentioned light entrance scattering structure 25 and the light exit surface scattering structure 26, the reflection surface scattering structure 23 is molded by a molding die for molding the light guide plate 18 with a resin material. By the molding, a number of microscopic reflection surface projections 23a are formed on the reflection sheet 22 mounting surface 18f. Each reflection surface projection 23a has an angle structure (has a substantially triangular cross section) and extends in the Y-axis direction. A number of elongated projections 23a are provided to be parallel to each other in the X-axis direction. The light exit surface projections 23a are provided in an irregular manner. The arrangement pitch of the reflection surface projections 23a is largest in an area adjacent to the second light entrance surfaces 18c and gradually decreases toward the either side end of the light guide plate 18 in the X-axis direction. The farther from the LED 16, the smaller the arrangement pitch becomes, that is, the reflection surface projections 23a are formed in a gradational arrangement. In other words, the closer to the LED 16, the lower the distribution density of the reflection surface projections 23a on the light exit surface 18d plane becomes, and the farther from the LED 16, the higher the distribution density becomes, that is, the reflection surface projections 23a are formed in a regular manner. The rays of light traveling in the light guide plate 18 to be directed to the reflection sheet 22 mounting surface 18f strike the sloped surfaces of the reflection surface projections 23a to be scattered. The degree of light scattering is relatively low on the side of the mounting surface 18f closer to the LED 16 in the X-axis direction and that is relatively high on the side farther from the LED 16. The light scattering efficiency increases in a gradual and continuous manner as it is farther from the LED 16, and it is lowered in a gradual and continuous manner as it is closer to the LED 16. Accordingly, in the area of the reflection sheet 22 mounting surface 18f closer to the LED 16 from which a relatively large amount of rays of light exit, the rays of light are relatively less likely to be directed to the light exit surface 18d side. In the areas of the mounting surface 18f farther from the LED 16 from which a relatively small amount of rays of light exit, the rays of light are relatively likely to be directed to the light exit surface 18d side. Therefore, the uniform (equalized) in-plane distribution of the amount of rays of light being directed from the reflection sheet 22 and the mounting surface 18f to the light exit surface 18d is achieved. The gaps formed between the reflection sheet 22 and the reflection surface projections 23a formed on the mounting surface 18f are air layers AR.

The liquid crystal display device 10 of the present embodiment is structured as mentioned before, and an operation thereof will be explained. Power of the liquid crystal display device 10 is turned on to light each LED 16. Rays of light emitted from each light emitting surface 16d, 16e of the LED 16 strike the corresponding light entrance surface 18b, 18c. The rays of light travel through the light guide plate 18 and exit through the light exit surface 18d. Specifically, the rays of light emitted from the LED chip 16b of the LED 16 are divided into two groups. One includes rays of light emitted from the first light emitting surface 16d and exiting outside of the LED 16 and the another includes rays of light emitted from the second light emitting surfaces 16e and exiting outside of the LED 16. The rays of light emitted from the LED chip 16b and directed to the first light emitting surface 16d transmit through the diffuser layer 24a that is the light emitting surface scattering structure 24 before reaching the first light emitting surface 16d. Therefore, the rays of light are scattered by the diffuser particles provided therein. Accordingly, the rays of light emitted from the first light emitting surface 16d have lowered directivity and have the highest emission intensity along the first light axis LA1 (the Z-axis direction). An angle distribution shows a tendency that the emission intensity gradually decreases as the angle with respect to the light axis LA1 increases.

The rays of light emitted from the first emitting surface 16d mostly enter the first light entrance surface 18b. The rays of light emitted from the second light emitting surfaces 16e mostly enter the second light entrance surfaces 18c. The rays of light entering the first light entrance surface 18b strike the sloped surfaces of the light entrance surface projections 25a of the light entrance surface scattering structure 25 to be scattered. Accordingly, the rays of light entering the first light entrance surface 18b have lowered directivity and travel through the light guide plate 18 in a wide angle range with respect to the first light axis LA1.

The rays of light entering the second light entrance surfaces 18c directly or indirectly strike the reflection sheet 22 mounting surface 18f. The rays of light indirectly strike the reflection sheet 22 mounting surface 18f after striking the side end surfaces 18e of the light guide plate 18. The reflection surface projections 23a are provided on the mounting surface 18f as the reflection surface scattering structure 23. Therefore, the rays of light guided from the second light entrance surfaces 18c into the light guide plate 18 strike the sloped surfaces of the reflection surface projections 23a to be scattered. If incident angles of light that strikes the sloped surfaces are larger than a critical angle, the light is totally reflected by the sloped surfaces and mostly directed toward the light exit surface 18d side. If incident angles of light that strikes the sloped surfaces are smaller than the critical angle, the light passes through the mounting surface 18f and strikes the reflection sheet 22 to be mostly directed toward the light exit surface 18d side. The degree of light scattering by the reflection surface projections 23a becomes lower as it is closer to the LED 16, and it becomes higher as it is farther from the LED 16. Therefore, the rays of light are less likely to be directed to the light exit surface 18d side in an area of the light guide plate 18 in which a relatively great amount of rays of light travel, and the rays of light are likely to be directed to the light exit surface 18d side in an area of the light guide plate 18 in which a relatively small amount of rays of light travel. Accordingly, the in-plane distribution (in the reflection sheet 22 and the mounting surface 18f) of the amount of rays of light that are directed from the reflection sheet 22 and the mounting surface 18f to the light exit surface 18d is unified.

As mentioned before, the rays of light entering the first light entrance surface 18b and the second light entrance surfaces 18c travel in the light guide plate 18 and exit outside of the light guide plate 18 from the light exit surface 18d. The light exit surface projections 26a are provided on the light exit surface 18d as the light exit surface scattering structure 26. Therefore, the rays of light directed to the light exit surface 18d side strike the sloped surfaces of the light exit surface projections 26a to be scattered. If incident angles of light that strikes the sloped surfaces are larger than a critical angle, the light is totally reflected by the sloped surfaces and mostly returned to the reflection sheet 22 side. If incident angles of light that strikes the sloped surfaces are smaller than the critical angle, the light passes through the sloped surfaces and exit outside. The degree of light scattering by the light exit surface projections 26a becomes lower as it is closer to the LED 16, and it becomes higher as it is farther from the LED 16. Therefore, the rays of light are less likely to exit from an area of the light guide plate 18 in which a relatively great amount of rays of light travel, and the rays of light are likely to exit from an area of the light guide plate 18 in which a relatively small amount of rays of light travel. Accordingly, the in-plane distribution in the light exit surface 18d of the amount of rays of light exiting to outside from the light exit surface 18d is unified.

The following effects are obtained in the present embodiment. The rays of light emitted from the first light emitting surface 16d of the LED 16 enter the first light entrance surface 18b and directly exit from the light exit surface 18d.

This improves light use efficiency and entire brightness, and this also partially increases the emission intensity. In the present embodiment, the diffuser layer 24a is provided on the first light emitting surface 16d as the light emitting surface scattering structure 24, and the light entrance surface projections 25a are provided on the first light entrance surface 18b as the light entrance surface scattering structure 25, and the light exit surface projections 26qa are provided on the light exit surface 18d as the light exit surface scattering structure 26. Therefore, directivity of rays of light emitted from the first light emitting surface 16d is lowered to unify the amount of rays of light emitted from the light exit surface 18d. This maintains improved entire brightness and unifies the brightness distribution. The rays of light emitted from the second light emitting surfaces 16e of the LED 16 are likely to be radiated in a wide range in the light guide plate 18 in the X-axis direction compared to the rays of light emitted from the first light emitting surface 16d and entering the light guide plate 18. This unifies the in-plane brightness distribution in the light exit surface 18d. Furthermore, the rays of light entering the second light entrance surfaces 18c strike the reflection surface projections 23a provided on the mounting surface 18f as the reflection surface scattering structure 23. Therefore, the amount of rays of light directed to the light exit surface 18d side is unified in the plane of the reflection sheet 22 and the mounting surface 18f. This unifies the in-plane brightness distribution in the light exit surface 18d.

No scattering structure is provided on the side end surfaces 18e of the light guide plate 18 unlike the light exit surface 18d and the mounting surface 18f. The side end surfaces 18e are interfaces with the air layer AR ensured between the adjacent light guide plates 18. Therefore, if the rays of light traveling in the light guide plate 18 strike the side end surface 18e, incident angle thereof is mostly larger than the critical angle and thus the rays of light are all reflected by the side end surface to be returned into the light guide plate 18. Accordingly, the rays of light do not travel or mix together between the light guide plates 18 that are arranged on a plane in the chassis 14. Therefore, the light guide plates 18 are optically independent from each other. Turning on and off of the LEDs 16 of each light guide plate 18 are controlled independently. The outgoing light (amounts of light, emission or non-emission of light) from the light exit surface 18d of each light guide plate 18 can be controlled independently. The driving of the backlight unit 12 can be controlled using an area active technology that provides control of outgoing light for each area. This significantly improves contrast that is very important for display performance of the liquid crystal display device 10.

As explained before, the backlight unit 12 of the present embodiment includes the LED 16 having the light emitting surfaces 16d, 16e and the light guide plate 18 having the light entrance surfaces 18b, 18c and the light exit surface 18d. The light entrance surfaces 18b, 18c are provided to face the light emitting surfaces 16d, 16e respectively and the rays of light emitted from the light emitting surfaces 16d, 16e enter the light entrance surfaces 18b, 18c. The rays of light exit from the light exit surface 18d. The light emitting surfaces 16d, 16e include the first light emitting surface 16d provided parallel to the light exit surface 18d and the second light emitting surfaces 16e provided such that a plane on the first light emitting surface 16d crosses a plane on each second light emitting surface 16e. The light entrance surfaces 18b, 18c includes the first light entrance surface 18b provided to face the first light emitting surface 16d and parallel to the light exit surface 18d and the second light entrance surfaces 18c provided to face the second light emitting surfaces 16e such that a plane on the first light entrance surface 18b crosses a plane on each second light entrance surface 18c.

The first light emitting surface 16d and the first light entrance surface 18b are parallel to the light exit surface 18d. Therefore, the rays of light emitted from the first light emitting surface 16d and entering the first light entrance surface 18b exit directly from the light exit surface 18d. Accordingly, the light exits from the light exit surface with improved use efficiency and brightness is improved. A plane on each of the second light emitting surfaces 16e and the second light entrance surfaces 18c crosses a plane on each of the first light emitting surface 16d and the first light entrance surface 18b that are parallel to the light exit surface 18d. Therefore, the rays of light emitted from the second light emitting surfaces 16e and entering the second light entrance surfaces 18c are likely to be radiated in a wide range in the light guide plate 18 along the light exit surface 18d compared to the rays of light emitted from the first light emitting surface 16d and entering the first light entrance surface 18b. Accordingly, uneven in-plane brightness distribution on the light exit surface 18d is less likely to be caused and the device is reduced in thickness. The uneven brightness is less likely to be caused and improved brightness is obtained and the device is reduced in thickness.

The light entrance surface scattering structure 25 is provided on the first light entrance surface 18b so as to scatter the rays of light emitted from the LED 16. With this configuration, the rays of light emitted from the LED 16 enter the first light entrance surface 18b with being scattered, and therefore the rays of light entering the first light entrance surface 18b are diffused in the direction parallel to the light exit surface 18d. Accordingly, the uneven brightness is less likely to be caused.

The light entrance surface scattering structure 25 includes a number of microscopic light entrance surface projections 25a. With this configuration, the microscopic light entrance surface projections 25a effectively scatter the rays of light emitted from the LED 16.

The light exit surface scattering surface 26 is provided on the light exit surface 18d so as to scatter the exiting rays of light. With this configuration, the rays of light exiting from the light exit surface 18d are scattered and the uneven brightness is less likely to be caused.

The light exit surface scattering structure 26 includes a number of microscopic light exit surface projections 26a. With this configuration, the microscopic light exit surface projections 26a effectively scatter the rays of light exiting from the light exit surface 18d.

The light exit surface scattering structure 26 is configured such that the light scattering efficiency is increased in a continuous and gradual manner as it is farther from the LED 16 in the direction parallel to the light exit surface 18d. The amount of rays of light traveling in the light guide plate 18 is relatively greater in an area closer to the LED 16 than in an area farther from the LED 16 in the direction parallel to the light exit surface 18d. Therefore, the degree of light scattering by the light exit surface scattering structure 26 is relatively lowered in the area closer to the LED 16 having a large amount of rays of light to reduce the amount of exiting rays of light. The degree of light scattering is relatively increased in the area farther from the LED 16 having a small amount of rays of light to increase the amount of exiting rays of light. Accordingly, uniform in-plane brightness distribution of the rays of light exiting from the light exiting surface 18d is achieved. Therefore, the uneven brightness is less likely to be caused.

The light emitting surface scattering structure 24 is provided on the first light emitting surface 16d so as to scatter the emitted light. With this configuration, the rays of light emitted from the LED 16 is scattered and dispersed in the direction parallel to the light exit surface 18d. The uneven brightness is less likely to be caused.

The light emitting surface scattering structure 24 includes the diffuser layer 24a having the diffuser particles scattered therein. With this configuration, the diffuser particles dispersed in the diffuser layer 24a scatter the rays of light emitted from the LED 16.

The reflection sheet 22 for reflecting the rays of light toward the light exit surface 18d side is provided on the surface of the light guide plate 18 opposite from the light exit surface 18d. With this configuration, the rays of light entering mainly the second light entrance surfaces 18c are effectively guided to the light exit surface 18d. This improves brightness.

The reflection surface scattering structure 23 for scattering light is provided on the reflection sheet 22 mounting surface 18f of the light guide plate 18. With this configuration, the rays of light from the reflection sheet 22 mounting surface 18f of the light guide plate 18 are scattered by the reflection surface scattering structure 23 and reflected by the reflection sheet 22 toward the light exit surface 18d side. The uneven brightness is less likely to be caused.

The reflection surface scattering structure 23 includes a number of microscopic reflection surface projections 23a. With this configuration, the rays of light exiting from the mounting surface 18f are effectively scattered.

The reflection surface scattering structure 23 is formed such that the degree of light scattering increases in a continuous and gradual manner as it is farther from the LED 16 in the direction parallel to the light exit surface 18d. The amount of rays of light in the light guide plate 18 is relatively greater in the area closer to the LED 16 than in the area farther from the LED 16 in the direction parallel to the light exit surface 18d. Therefore, the degree of light scattering by the reflection surface scattering structure 23 is reduced relatively in an area closer to the LED 16 having a large amount of rays of light to reduce the amount of rays of light reflected by the reflection sheet 22. The degree of light scattering is increased relatively in an area farther from the LED 16 having a small amount of rays of light to increase the amount of rays of light reflected by the reflection sheet 22. This unifies the in-plane distribution of the amount of rays of light reflected by the reflection sheet 22 and the uneven brightness is less likely to be caused.

The LED housing recess 18a for housing the LED 16 is provided in the light guide plate 18. The first light entrance surface 18b and the second light entrance surfaces 18c are provided on surfaces of the LED housing recess 18a. With this configuration, the LED 16 is housed in the LED housing recess 18*a* of the light guide plate 18, and this reduces a thickness of an entire device.

The second light emitting surfaces 16*e* and the second light entrance surfaces 18*c* are formed perpendicular to the light exit surface 18*d*. With this configuration, the rays of light emitted from the second light emitting surfaces 16*e* and entering the second light entrance surfaces 18*c* are radiated in a wider area in the direction parallel to the light exit surface 18*d*. The uneven brightness is less likely to be caused.

The LED 16 is used as the light source. With this configuration, improved brightness is achieved.

The LED 16 includes a pair of second light emitting surfaces 16*e* each of which exits light in an opposite direction along the light exit surface 18*d*. The LED 16 is arranged in a substantially middle portion of the light guide plate 18 in the direction parallel to the light exit surface 18*d*. With this configuration, the rays of light exiting from each second light emitting surface 16*e* are emitted in the opposite directions. Therefore, variation in the amount of rays of light emitted is less likely to be caused and the uneven brightness is less likely to be caused.

The light guide plates 18 are arranged in parallel to each other in the direction parallel to the light exit surface 18*d*. The low refractive index layer having a lower refractive index than the light guide plate 18 is provided between the adjacent light guide plates 18. With this configuration, the rays of light traveling in the light guide plate 18 are totally reflected at the interface between the light guide plate 18 and the low refractive index layer. Therefore, the rays of light traveling in the adjacent guide plates are less likely to be mixed and the outgoing light (emission or non-emission of light) from the light exit surface 18*d* of each light guide plate 18 can be controlled independently. The device can increase in size in the direction parallel to the light exit surface 18*d*.

The light guide plates 18 are arranged parallel to each other two-dimensionally. With this configuration, the device can increase in size in the direction parallel to the light exit surface 18*d*.

The low refractive index layer is the air layer AR. With this configuration, special components for forming the air layer AR are not required. This reduces a cost.

The liquid crystal display device 10 of the present embodiment includes the backlight unit 12 and the liquid crystal panel 11 displaying using light from the backlight unit 12. According to the liquid crystal display device 10, the backlight unit 12 that supplies light to the liquid crystal panel 11 hardly causes uneven brightness and can reduce its thickness. Therefore, display with excellent display quality is achieved and the device can reduce its thickness.

<Second Embodiment>

Next, the second embodiment of the present invention will be explained with reference to FIG. 6. In the second embodiment, the LED 16 and the light guide plate 18 of the first embodiment is altered to an LED 16A and a light guide plate 18A, respectively. The same components as the first embodiment will be indicated with the same symbols. The symbols with the letter A are used for referring to the same parts as the first embodiment. The same configuration, functions and effects will not be explained.

As illustrated in FIG. 6, the LED 16A includes only one second light emitting surface 16*e*A (two-sided light emission type). Specifically, a board 16*a*A forming the LED 16A is formed to have an L-shaped cross section and includes a bottom portion 16*aa* and a side portion 16*ab*. The bottom portion 16*aa* extends along an LED board 17A and the side portion 16*ab* extends upward from the LED board 17A and covers a resin material 16*c*A from a side. The board 16*a*A is formed of a material having reflectivity and a light blocking property. Therefore, a second light emitting surface 16*e*A is provided only on a side surface of the LED 16A opposite from the side portion 16*ab*. The rays of light emitted from an LED chip 16*b*A and striking the side portion 16*ab* of the board 16*a*A are reflected by the side portion 16*ab* and the reflected rays of light exit from the first light emitting surface 16*d*A or the second light emitting surface 16*e*A.

An LED housing recess 18*a*A is provided at a left-side end portion of the light guide plate 18A in FIG. 6. Namely, the LED housing recess 18*a*A is provided at an end portion of the light guide plate 18A that is on a side at which the side portion 16*ab* of the LED 16A is located. That is, the LED housing recess 18*a*A is provided at an end portion of the light guide plate 18A that is on a side opposite from a side at which the second light emitting surface 16*e*A of the LED 16A is located. One of the surfaces of the LED housing recess 18*a*A that faces the second light emitting surface 16*e*A of the LED 16A, that is a right-side surface in FIG. 6, is a second light entrance surface 18*c*A. The rays of light emitted from the second light emitting surface 16*e*A and entering the second light entrance surface 18*c*A are guided in the light guide plate 18A to the right side in FIG. 6, that is a direction in that it is farther from the LED 16A and directed to the light exit surface 18*d*A by the reflection sheet 22A. The reflection surface projections 23*a*A of the reflection surface scattering structure 23A and the light exit surface projections 26*a*A of the light exit surface scattering structure 26A are provided in a gradational arrangement such that the distribution density increases in a gradual manner and the degree of light scattering also increases as is from the left end portion to the right end portion in FIG. 6, that is, as is farther away from the LED 16A.

As explained before, in the present embodiment, the LED 16A includes the side portion 16*ab* having a light blocking property on a surface of the LED 16A opposite from the second light emitting surface 16*e*A in the direction parallel to the light exit surface 18*d*A, and the LED 16A is arranged at an end portion of the light guide plate 18A in the direction parallel to the light exit surface 18*d*A. With this configuration, the LED 16A is manufactured with a low cost compared to the case in that a pair of second light emitting surfaces 16*e* is provided in the direction parallel to the light exit surface 18*d* such that rays of light are emitted in opposite directions from each of the second light emitting surface 16*e*.

<Third Embodiment>

Next, the third embodiment of the present invention will be explained with reference to FIG. 7. In the third embodiment, the configuration of the light entrance surface scattering structure 25 is altered to alight entrance surface scattering structure 25B. The same components as the first embodiment will be indicated with the same symbols. The symbols with the letter B are used for referring to the same parts as the first embodiment. The same configuration, functions and effects will not be explained.

Alight entrance surface scattering structure 25B is provided on a first light entrance surface 18*b*B. As illustrated in FIG. 7, the light entrance surface scattering structure 25B includes a diffuser layer 25*b* having a predetermined amount of diffuser particles diffused therein. A configuration of the diffuser layer 25*b* is similar to that of the diffuser layer 24*a*B provided on the first light emitting surface 16*d*B. The rays of light entering the diffuser layer 25*b* are scattered by the diffuser particles. Due to the scattering effects of the diffuser layer 25*b* and the diffuser layer 24*a*B provided on a first light emitting surface 16*d*B, directivity of the rays of light emitted from the first light emitting surface 16dB and entering the first light entrance surface 18bB is lowered.

As explained before, according to the present embodiment, the light entrance surface scattering structure 25B includes the diffuser layer 25b having the diffuser particles therein. With this configuration, the diffuser particles dispersed in the diffuser layer 25b effectively diffuse the rays of light emitted from the LED 16B.

<Fourth Embodiment>

Next, the fourth embodiment of the present invention will be explained with reference to FIG. 8. In the fourth embodiment, the shape of the first light emitting surface 16d is altered. The same components as the first embodiment will be indicated with the same symbols. The symbols with the letter C are used for referring to the same parts as the first embodiment. The same configuration, functions and effects will not be explained.

As illustrated in FIG. 8, a first light emitting surface 16dC is formed in substantially a spherical shape and has substantially an arched cross section. With this configuration, the rays of light exit from the first light exit surface 16dC in a wide-angle range and directivity of the light is lowered.

<Other Embodiments>

The present invention is not limited to the above embodiments explained in the above description. The following embodiments may be included in the technical scope of the present invention, for example.

(1) In the above embodiments, the first light emitting surface of the LED and the first light exit surface of the light guide plate are substantially parallel to the light exit surface and flat surfaces along the X-Y plane. However, the first light emitting surface or the first light entrance surface may be slanted with respect to the X-axis direction or the Y-axis direction, that is, they may not be parallel to the light exit surface.

(2) In the above embodiments, the second light emitting surface of the LED and the second light entrance surface of the light guide plate are substantially perpendicular to the light exit surface and flat surfaces along the Z-Y plane. However, the second light emitting surface or the second light entrance surface may be slanted with respect to the Z-axis direction or the Y-axis direction, that is, they may not be perpendicular to the light exit surface. The second light emitting surface or the second entrance surface may be formed in a curved surface such as an arched surface.

(3) In the above embodiments, a pair of the second light emitting surfaces or a single second light emitting surface is provided on the LED. However, three or more light emitting surfaces may be provided. If the LED is configured to have a square shape in a plan view, four surfaces adjacent to the first light emitting surface may be the second light emitting surfaces. This enables rays of light to emit radially in a plan view. If the LED is configured to have a circular shape in a plan view, the second light emitting surface may be formed in a circular shape in a plan view. This also enables rays of light to emit radially in a plan view.

(4) In the above embodiments, the light axis of the rays of light emitted from the second light emitting surface of the LED matches the long-side direction of the light guide plate. However, it may match the short-side direction of the light guide plate.

(5) In the above embodiments, the light axis of the rays of light emitted from the second light emitting surface of the LED matches the horizontal direction of the liquid crystal display device and the backlight unit. However, it may match the vertical direction of the liquid crystal display device and the backlight unit.

(6) In the above embodiments, the light entrance surface scattering structure includes a number of microscopic light entrance surface projections or the diffuser layer. The light entrance surface scattering structure may include a number of microscopic recesses. The resin molding is described as a specific molding method for forming the light entrance surface scattering structure, however, microscopic recess or projections may be formed by coating fine powders such as silica. As another method, a blast processing may be performed on the first light entrance surface to form the microscopic recesses. With any of the methods, the recesses or the projections may be arranged in an irregular manner.

(7) In the above embodiments, a number of microscopic projections are provided as the light exit surface scattering structure and the reflection surface scattering structure. However, a number of microscopic recesses may be provided as the light exit surface scattering structure and the reflection surface scattering structure. The resin molding is described as a specific molding method for forming the light exit surface scattering structure and the reflection surface scattering structure, however, the microscopic recesses or projections may be formed by coating fine powders such as silica. As another method, a blast processing may be performed on the light exit surface or the reflection sheet mounting surface to form the microscopic recesses. With any of the methods, the recesses or the projections may be arranged in an irregular manner.

(8) In the above embodiments, the distribution density (the degree of scattering) of the microscopic projections provided as the light exit surface scattering structure and the reflection surface scattering structure is changed in a continuous and gradual manner. However, the distribution density of the microscopic recesses or projections may be changed in a step-by-step and sequential manner. The distribution density of the microscopic recesses or projections may be uniform.

(9) In the above embodiments, the light emitting surface scattering structure includes the diffuser layer having the diffuser particles diffused in a transparent base member. A sheet made of a white resin material may be used as the light emitting surface scattering structure. In such a case, a thickness of the sheet is reduced so as to obtain desired transmission (smaller than the transmission of the resin material forming the LED or the light guide plate).

(10) In the above embodiments, the LEDs and the light guide plates are provided in a one-on-one arrangement. However, a number of LEDs may be provided for one light guide plate. In such a case, the LEDs may be collectively arranged in the LED housing recess or each LED may be independently arranged in respective LED housing recess.

(11) In the above embodiments, the reflection sheet is provided separately on each light guide plate. One reflection sheet may be provided for a number of light guide plates. In such a case, the reflection sheet may be provided on areas between the adjacent light guide plates.

(12) In the above embodiments, the air layers are used as the low refractive index layers. A low refractive index layer made of a low refractive index material may be provided in each gap between the light guide plates.

(13) In the above embodiments, each LED and each light guide plate has a rectangular shape in a plan view. However, each LED and each light guide plate may have a square shape in a plan view.

(14) In the above embodiments, the LEDs and the light guide plates (unit light emission members) are arranged parallel to each other two-dimensionally. However, they may be arranged parallel to each other one-dimensionally. Specifically, the LED and the light guide plates may be arranged parallel to each other only in the vertical direction or the LED and the light guide plates may be arranged parallel to each other only in the horizontal direction. Only one set of the LED and the light guide plate may be provided.

(15) In the above embodiments, each LED includes three different LED chips configured to emit respective colors of RGB. However, LEDs each including a single LED chip configured to emit a single color of blue or violet and each configured to emit white light using fluorescent material may be used.

(16) In the above embodiments, each LED includes three different LED chips configured to emit respective colors of RGB. However, LEDs each including three different LED chips configured to emit respective colors of cyan (C), magenta (M) and yellow (Y) may be used.

(17) In the above embodiments, the LEDs are used as point light sources. However, point light sources other than LEDs can be used.

(18) The optical member may be configured differently from the above embodiments. Specifically, the number of diffusers or the number and the kind of the optical sheets can be altered as necessary. Furthermore, a plurality of optical sheets in the same kind may be used.

(19) In the above embodiments, the liquid crystal panel and the chassis are held in the vertical position with the short-side direction thereof aligned with the vertical direction. However, the liquid crystal panel and the chassis may be held in the vertical position with the long-side direction thereof aligned with the vertical direction.

(20) In the above embodiments, TFTs are used as switching components of the liquid crystal display device. However, the technology described the above can be applied to liquid crystal display devices including switching components other than TFTs (e.g., thin film diode (TFD)). Moreover, the technology can be applied to not only color liquid crystal display devices but also black-and-white liquid crystal display devices.

(21) In the above embodiments, the liquid crystal display device including the liquid crystal panel as a display component is used in the above embodiment. The technology can be applied to display devices including other types of display components.

(22) In the above embodiments, the television receiver including the tuner is used. However, the technology can be applied to a display device without a tuner.

The invention claimed is:

1. A lighting device comprising:
a light source including a light emitting surface;
a light guide member including a light entrance surface that light emitted from the light emitting surface enters and a light exit surface from which the light exits, wherein
the light emitting surface includes a first light emitting surface and a second light emitting surface, the first light emitting surface being substantially parallel to the light exit surface and a plane on the first light emitting surface crossing a plane on the second light emitting surface;
the light entrance surface includes a first light entrance surface and a second light entrance surface, the first light entrance surface being provided to face the first light emitting surface and substantially parallel to the light exit surface and the second light entrance surface being provided to face the second light emitting surface and a plane on the first light entrance surface crossing a plane on the second light entrance surface; and
the lighting device further comprises a light entrance surface scattering structure provided on the first light entrance surface and configured to scatter the light emitted from the light source when the light enters the first light entrance surface.

2. The lighting device according to claim 1, wherein the light entrance surface scattering structure includes one of microscopic recesses and microscopic projections.

3. The lighting device according to claim 1, wherein the light entrance surface scattering structure includes a diffuser layer having a diffusing material scattered therein.

4. The lighting device according to claim 1, further comprising a light exit surface scattering structure provided on the light exit surface and configured to scatter the light exiting from the light exit surface.

5. The lighting device according to claim 4, wherein the light exit surface scattering structure includes one of microscopic recesses and microscopic projections.

6. The lighting device according to claim 4, wherein the light exit surface scattering structure is configured so that a degree of light scattering is increased in a continuous and gradual manner as it is farther from the light source in a direction along the light exit surface.

7. The lighting device according to claim 1, further comprising a reflection member provided on a surface of the light guide member opposite from the light exit surface and configured to reflect the light to a light exit surface side.

8. The lighting device according to claim 7, further comprising a reflection surface scattering structure provided on a mounting surface of the light guide member on which the reflection member is provided.

9. The lighting device according to claim 8, wherein the reflection surface scattering structure includes one of microscopic recesses and microscopic projections.

10. The lighting device according to claim 8, wherein the reflection surface scattering structure is configured so that a degree of light scattering is increased in a continuous and gradual manner as it is farther from the light source in a direction along the light exit surface.

11. The lighting device according to claim 1, wherein the light guide member includes a light source housing recess configured to house the light source, and the light source housing recess has the first light entrance surface and the second light entrance surface on its inner surface.

12. The lighting device according to claim 1, wherein a plane on each of the second light emitting surface and the second light entrance surface crosses a plane on the light exit surface.

13. The lighting device according to claim 1, wherein the light source is a light emitting diode.

14. A display device comprising:
the lighting device according to claim 1; and
a display panel configured to provide display using light from the lighting device.

15. The display device according to claim 14, wherein the display panel is a liquid crystal panel including liquid crystals sealed between a pair of substrates.

16. A television receiver comprising the display device according to claim 14.

17. A lighting device comprising:
a light source including a light emitting surface;
a light guide member including a light entrance surface that light emitted from the light emitting surface enters and a light exit surface from which the light exits, wherein
the light emitting surface includes a first light emitting surface and a second light emitting surface, the first light emitting surface being substantially parallel to the light exit surface and a plane on the first light emitting surface crossing a plane on the second light emitting surface;

the light entrance surface includes a first light entrance surface and a second light entrance surface, the first light entrance surface being provided to face the first light emitting surface and substantially parallel to the light exit surface and the second light entrance surface being provided to face the second light emitting surface and a plane on the first light entrance surface crossing a plane on the second light entrance surface; and the lighting device further comprises a light emitting surface scattering structure provided on the first light emitting surface and configured to scatter light emitted from the first light emitting surface.

18. The lighting device according to claim 17, wherein the light emitting surface scattering structure includes a diffuser layer having a diffusing material scattered therein.

19. A lighting device comprising:

a light source including a light emitting surface;

a light guide member including a light entrance surface that light emitted from the light emitting surface enters and a light exit surface from which the light exits, wherein the light emitting surface includes a first light emitting surface and a second light emitting surface, the first light emitting surface being substantially parallel to the light exit surface and a plane on the first light emitting surface crossing a plane on the second light emitting surface;

the light entrance surface includes a first light entrance surface and a second light entrance surface, the first light entrance surface being provided to face the first light emitting surface and substantially parallel to the light exit surface and the second light entrance surface being provided to face the second light emitting surface and a plane on the first light entrance surface crossing a plane on the second light entrance surface;

the light source is a light emitting diode; and the light emitting diode has a pair of the second light emitting surfaces provided in a middle portion of the light guide member in a direction along the light exit surface, the second light emitting surfaces being provided so that a direction in which the light exiting from one of the second light emitting surfaces is opposite from a direction in which the light exiting from the another one of the second light emitting surfaces in the direction along the light exit surface.

20. A lighting device comprising:

a light source including a light emitting surface;

a light guide member including a light entrance surface that light emitted from the light emitting surface enters and a light exit surface from which the light exits, wherein the light emitting surface includes a first light emitting surface and a second light emitting surface, the first light emitting surface being substantially parallel to the light exit surface and a plane on the first light emitting surface crossing a plane on the second light emitting surface;

the light entrance surface includes a first light entrance surface and a second light entrance surface, the first light entrance surface being provided to face the first light emitting surface and substantially parallel to the light exit surface and the second light entrance surface being provided to face the second light emitting surface and a plane on the first light entrance surface crossing a plane on the second light entrance surface;

the light source is a light emitting diode; and the light emitting diode has a light blocking portion on a surface opposite from the second light emitting surface in a direction along the light exit surface, and the light emitting diode is provided at an end portion of the light guide member in the direction along the light exit surface.

21. A lighting device comprising:

a light source including a light emitting surface;

a light guide member including a light entrance surface that light emitted from the light emitting surface enters and a light exit surface from which the light exits, wherein the light emitting surface includes a first light emitting surface and a second light emitting surface, the first light emitting surface being substantially parallel to the light exit surface and a plane on the first light emitting surface crossing a plane on the second light emitting surface;

the light entrance surface includes a first light entrance surface and a second light entrance surface, the first light entrance surface being provided to face the first light emitting surface and substantially parallel to the light exit surface and the second light entrance surface being provided to face the second light emitting surface and a plane on the first light entrance surface crossing a plane on the second light entrance surface; and the light guide member includes a number of light guide members arranged substantially parallel to each other in the direction along the light exit surface, and a low refractive index layer having a refractive index lower than the light guide member is provided between the adjacent light guide members.

22. The lighting device according to claim 21, wherein the light guide members are arranged substantially parallel to each other two-dimensionally.

23. The lighting device according to claim 21, wherein the low refractive index layer is an air layer.

* * * * *